May 26, 1959     H. L. NAIMER     2,888,282
ADJUSTABLE ROTARY CONNECTION BETWEEN A PRISMATIC SHAFT
AND A COAXIAL CONNECTING MEMBER
Filed Nov. 14, 1956
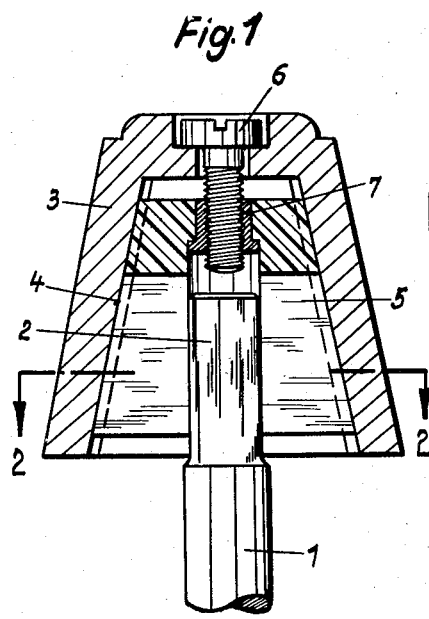
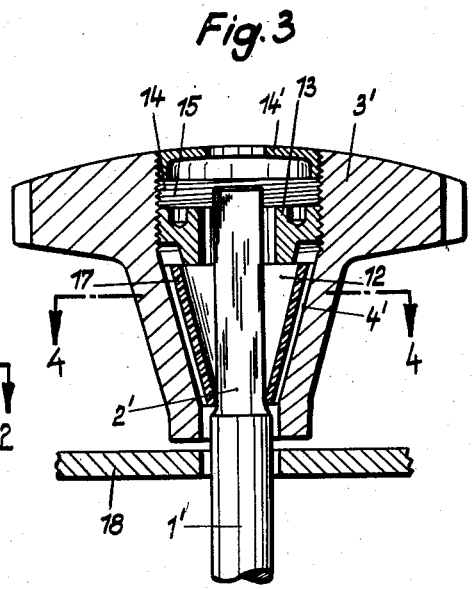
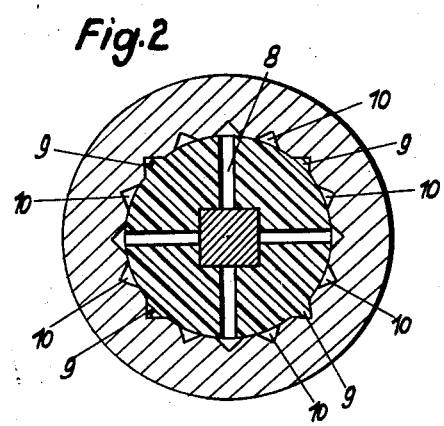
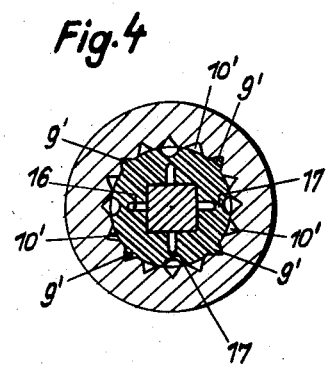
INVENTOR:
HUBERT LAURENZ NAIMER
BY
ATTORNEY

United States Patent Office 2,888,282
Patented May 26, 1959

2,888,282

ADJUSTABLE ROTARY CONNECTION BETWEEN A PRISMATIC SHAFT AND A COAXIAL CONNECTING MEMBER

Hubert Laurenz Naimer, Vienna, Austria

Application November 14, 1956, Serial No. 622,199

Claims priority, application Austria November 16, 1955

1 Claim. (Cl. 287—53)

The invention relates to an adjustable rotary connection between a prismatic shaft and a coaxial connection member, and particularly, but not exclusively, to a particular construction of a rotatable knob for mounting on a rotatable shaft of an electrical appliance.

It is known to fasten the rotatable knobs of electrical appliances on a cylindrical or conical shaft end portion of the appliance by arranging a slotted wedge member having a conical outer surface to operate between the rotatable knob and the shaft end portion, the said wedge member being pressed by means of a centrally arranged screw between the knob and the shaft end portion, which is cylindrical, and thereby rigidly connecting the knob and the shaft end portion for rotation one with the other.

The amount of torque which can be transmitted with such a knob depends on the friction conditions, i.e. it depends substantially on the amount of pressure which is effective on the one hand between the conical inner surface of the knob and the outer surface of the wedge member and on the other hand between the inside of the wedge member and the end part of the shaft. In order to guarantee reliable transmission of rotary movement from the knob to the shaft even against the opposing torques which normally occur, this pressure must be considerable and therefore the cone must be drawn with considerable force into the knob. The knob, which is generally composed of a synthetic resin, must accordingly be of very robust construction.

In another known knob fastening, the shaft end part has a prismatic configuration and therefore the surfaces of the wedge member co-operating with it are also plane surfaces; but in this construction the surfaces effective between the wedge member and the knob are also plane. In this case reliable transmission of movement to the shaft of the electrical appliance is guaranteed even when the wedge member is moderately tightened, but, in contrast to wedge members which are externally conical, the knob can only be fixed on the shaft end part in specific relative positions determined by the number of side surfaces of the shaft profils.

A disadvantage of all known types of fastening is that the risk of accidental loosening cannot wholly be excluded by simple means. Experience has shown that even when the wedge member is tightened relatively firmly, although there is a limit to this owing to the limited strength of the knobs which are normally made of an electrically insulating material, it is not possible with any reliability to ensure that the knob remains fast on the end part of the shaft after long use. If such loosening has taken place, a knob of the first-mentioned known construction will fail to function, whilst a knob of the second-mentioned known construction, although it will transmit rotary movement to the shaft, can in some cases fall off the said shaft completely.

The rotary connection according to the present invention, which is intended more particularly for the operation of electric rotary switches but has also other possible uses as will be seen hereinafter, avoids the disadvantages of the known types of connection while retaining their advantages. It also guarantees a permanently secure mounting even under very unfavourable conditions, such as when it is subjected continuously to vibrations or shocks, i.e. under conditions in which the simple knob fastenings constructed and arranged as already indicated could not hitherto be used at all. The invention proceeds from the known construction which is provided with a wedge member adapted to be clamped fast between the knob and the end part of the shaft. According to the invention, the wedge member consists of a material which is more elastic and considerably more easily deformable than the parts enclosing it in the rotary connection and which is preferably a synthetic material, such as for example one having a polyamide base, or a non-metallic material that as regards strength and elasticity does not behave any more unfavourably in the present connection, and the said wedge member has an outer surface which is of conical shape as is known per se. The outer surface of the clamping member advantageously comprises at least one retaining projection, while the inner surface of the knob body which co-operates with the outer surface of the wedge member comprises a plurality of recesses, each retaining projection on the wedge member being adapted to fit into any of these recesses.

Two constructional embodiments of the invention, as applied to a rotary knob for an electric switch, are illustrated diagrammatically and by way of example in the accompanying drawings; in which:

Figs. 1 and 2 show a construction in which a wedge member is drawn into the knob, and Figs. 3 and 4 a construction in which the wedge member is pressed downwardly into the knob, and Figs. 2 and 4 are sectional views taken respectively on the lines 2—2 and 4—4 of Figs. 1 and 3.

In all the figures like parts are designated by like reference numerals.

In the embodiment according to Figures 1 and 2 rotatable shaft 1 of the electric switching device terminates in a four-sided part 2 which in the present case has a square cross-section. The rotary knob 3 is formed internally with a conical hollow space 4 in which a wedge member 5 is axially displaceable by means of a screw 6 mounted in the knob 3. The wedge member 5 has the same external conicity as the hollow space 4 and is made of superpolyamide or of a material which behaves similarly from the mechanical point of view. For this purpose, the wedge member 5 is fitted with an internally threaded sleeve 7 which however can be dispensed with if the wedge member 5 is sufficiently strong. Formed in the wedge member 5 by means of slots 8 are four segments each of which bears against a side of the part 2. By tightening the screw 6, the elastically deformable wedge member 5 is pressed against the part 2 of the shaft 1 and against the knob 3, whereby these two parts are securely coupled together for rotation one with the other.

The deformability of the member 5, in conjunction with the advantageous frictional characteristics of the synthetic plastic material, not only ensures a permanently rattle-free mounting of the knob on the shaft end, but also enables considerable torques to be transmitted without the cone 5 having to be drawn too strongly into the knob 3 in order to do so. Heavy stressing of the knob 3 is thereby avoided. But if it is desired to increase still further the torque which can be transmitted, without having to reckon with unusually great axial forces, the external surface of the wedge member 5 may be provided with riblike projections 9 and the inner surface 4 of the knob body can be provided with corresponding recesses 10 into which the ribs 9 fit, or vice versa. It is sufficient to provide only a few ribs 9. The number of recesses 10 i.e. their spacing, determines the number of possible relative positions between the knob and the shaft.

In the embodiment according to Figs. 3 and 4, the wedge member, which is designated by reference 12, is pressed downwardly against the inner surface 4' of the knob 3' and against the flat faces of the shaft 1' by a nut 13 which engages with an internal screwthread 14 in the knob 3'. A cover cap 14' serves to close the hollow space 15 in which the nut 13 is arranged. It may be expedient to cause the nut 13 to act on the wedge member 12 by way of a disc (not shown) resting on the said member. The wedge member 12 is again formed with projections 9' which fit into correspondingly profiled grooves 10' in the knob body 3', or vice versa. Fig. 4 shows the wedge member 12 in cross-section. 16 designates the slots which in this case, however, expediently are not through slots since this would lead to the formation of a plurality of independent wedge members, which is inconvenient; instead, readily deformable bridge portions 17 are left, which ensure that the individual portions of the wedge member are held together.

It will be apparent that this knob fastening not only enables sufficient clearance to be provided for the axial spacing of the knob relatively to the end of the shaft or relatively to the cover plate 18, but also provides a reliable, sufficiently elastic type of fastening which is permanently rattle-free and can transmit very considerable torques without stressing the knob itself excessively. Precisely because the wedge member has sufficient elasticity, there is no longer any risk of accidental loosening of the knob such as is liable to occur as a result of vibration. It will also be apparent that the invention is not limited to the knob fastening which is illustrated, but can be used in every case where it is desired to connect a disc, a wheel or any other rotatable element to a prismatic shaft in such manner as to be fixed for rotation therewith and axially displaceable relatively to the said shaft.

What I claim is:

An adjustable connection between a polygonal rotary shaft of an electrical device and a plastic actuating knob having an internal conical bore, consisting of a deformable wedge member having a polygonal central bore inter-locking with the polygonal rotary shaft and an external conical bearing surface in engagement with the internal conical bore of the knob, the wedge member and the knob having cooperating ridges and grooves, the wedge member being of a non-metallic and insulating material being considerably more readily deformable than the plastic knob and having the strength and elasticity of polyamide resins, and axially movable pressure means engaging the knob and the wedge member for clamping the wedge member between the shaft and the knob.

References Cited in the file of this patent

UNITED STATES PATENTS

| | | |
|---|---|---|
| 1,343,086 | Neil | June 8, 1920 |
| 1,395,419 | Hutchins | Nov. 1, 1921 |
| 1,491,342 | Eckhardt | Apr. 22, 1924 |
| 2,061,811 | Sinko | Nov. 24, 1936 |
| 2,067,751 | Beegle | Jan. 12, 1937 |
| 2,587,862 | Krucki | Mar. 4, 1952 |
| 2,759,734 | Velepec | Oct. 31, 1956 |

FOREIGN PATENTS

| | | |
|---|---|---|
| 337,617 | Great Britain | Nov. 6, 1930 |